United States Patent
Sauk et al.

(10) Patent No.: US 7,776,483 B2
(45) Date of Patent: Aug. 17, 2010

(54) METHOD AND SYSTEM OF ACTIVATING FUEL CELL STACK

(75) Inventors: Jun-Ho Sauk, Suwon-si (KR); Young-Seung Na, Suwon-si (KR); Kyoung-Hwan Choi, Suwon-si (KR); Sang-Kyun Kang, Suwon-si (KR); Ji-Rae Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/341,139

(22) Filed: Dec. 22, 2008

(65) Prior Publication Data
US 2009/0311562 A1    Dec. 17, 2009

(30) Foreign Application Priority Data
Jun. 17, 2008    (KR) .................... 10-2008-0056814

(51) Int. Cl.
*H01M 8/02*    (2006.01)
*H01M 8/04*    (2006.01)
(52) U.S. Cl. .................... 429/445; 429/428; 429/506
(58) Field of Classification Search .................... None
See application file for complete search history.

(56) References Cited

U.S. PATENT DOCUMENTS

| | | | | |
|---|---|---|---|---|
| 6,015,633 A | * | 1/2000 | Carlstrom et al. | 429/13 |
| 6,114,058 A | * | 9/2000 | Judkins et al. | 429/13 |
| 6,379,485 B1 | * | 4/2002 | Borglum | 156/89.11 |
| 2002/0142205 A1 | | 10/2002 | Kim et al. | |
| 2003/0203263 A1 | * | 10/2003 | Brown et al. | 429/31 |
| 2004/0214064 A1 | * | 10/2004 | Cavalca et al. | 429/33 |
| 2004/0247986 A1 | * | 12/2004 | Takeguchi et al. | 429/38 |
| 2006/0019131 A1 | | 1/2006 | Akiyama et al. | |
| 2007/0231650 A1 | * | 10/2007 | Jiang et al. | 429/32 |

FOREIGN PATENT DOCUMENTS

| | | |
|---|---|---|
| JP | 2002-110199 | 4/2002 |
| JP | 2003-272676 | 9/2003 |
| JP | 2004171887 A * | 6/2004 |
| JP | 2004288538 A * | 10/2004 |
| JP | 2006-032328 | 2/2006 |
| JP | 2009087587 A * | 4/2009 |
| KR | 10-0397611 | 8/2003 |
| KR | 2004-98530 | 11/2004 |
| KR | 2007-99354 | 10/2007 |

OTHER PUBLICATIONS

English Abstract of Korean Patent Publication No. 2002-76946.

* cited by examiner

*Primary Examiner*—Robert Hodge
(74) *Attorney, Agent, or Firm*—Stein McEwen, LLP

(57) ABSTRACT

An activation method and system to selectively activate defective cells in a laminated fuel cell stack. The system includes a tank to store a polar solvent used to activate the cells; a body including a transfer unit to transfer the polar solvent to the fuel cell stack and a control unit to control the transfer unit; and a nozzle coupled to the body, to be inserted into an inlet manifold of the fuel cell stack. The nozzle has an opening positioned opposite to a channel inlet of at least one non-activated cell of the plurality of cells, to jet the polar solvent into only a channel of the non-activated cell, through the opening.

21 Claims, 7 Drawing Sheets

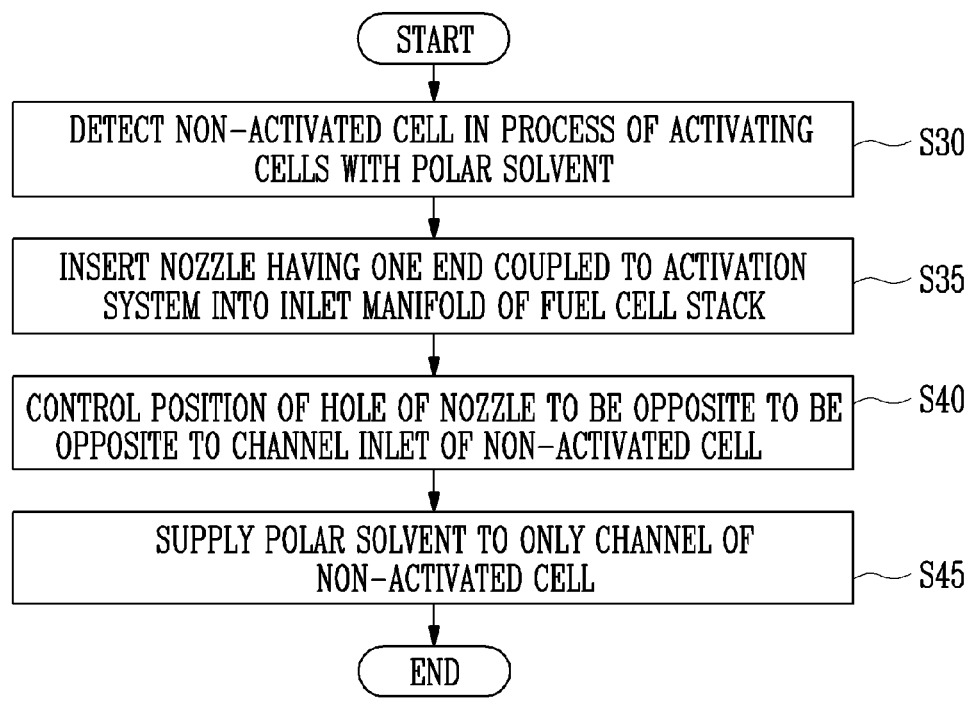
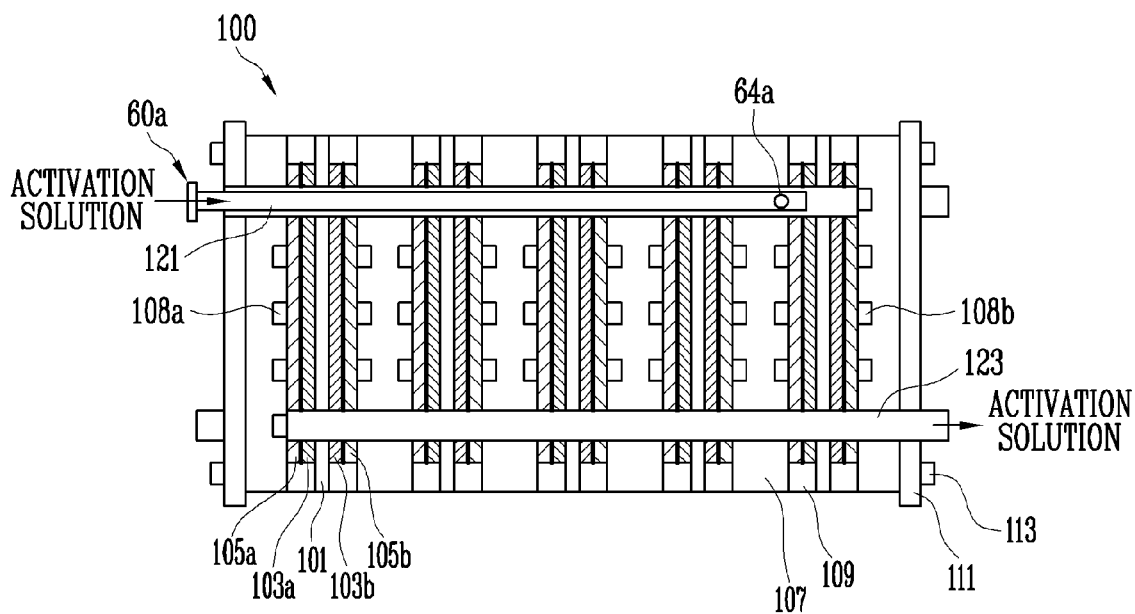

METHOD AND SYSTEM OF ACTIVATING FUEL CELL STACK

CROSS-REFERENCE TO RELATED APPLICATION

This application claims priority to and the benefit of Korean Patent Application No. 2008-56814, filed Jun. 17, 2008, in the Korean Intellectual Property Office, the disclosure of which is incorporated herein by reference.

BACKGROUND OF THE INVENTION

1. Field of the Invention

Aspects of the present invention relate to an activation method and system capable of securing the uniform performance of a laminated fuel cell stack.

2. Description of Related Art

A fuel cell is a system that directly converts various fuels, such as natural gas, liquefied natural gas, kerosene, coal, naphtha, methanol, hydride, and waste gas, into electricity. The fuel cell has come into the spotlight as a next-generation, clean, power generation system. A fuel cell may be a molten carbonate fuel cell (MCFC), a solid oxide fuel cell (SOFC), a polymer electrolyte fuel cell (PEFC), a phosphoric acid fuel cell (PAFC), an alkaline fuel cell (AFC), and the like, depending on an electrolyte used therein.

A polymer electrolyte membrane fuel cell and a proton exchange membrane fuel cell (PEMFC) use an ion-exchange membrane that includes a solid polymer electrolyte. The solid polymer electrolyte is resistant to corrosion and evaporation, and allows for a high current density per unit area. Further, since a PEMFC has a higher output and a lower operation temperature than other fuel cells, PEMFCs are often used to power small electronic devices, such as notebook computers. Furthermore, research has been actively conducted to develop a PEMFC to power automobiles, yachts, buildings, or the like.

A direct methanol fuel cell uses an ion-exchange membrane that is made of a solid polymer electrolyte. The direct methanol fuel cell is typically operated at a temperature below 100° C., using a liquid fuel such as methanol instead of a fuel reformer. For this reason, a direct methanol fuel cell is suitable as a power source for small electronic devices.

A direct methanol fuel cell may be manufactured as a laminated stack or a flat plate stack. The laminated stack includes a plurality of cells that are laminated to one another, by interposing separators between the cells. The flat plate stack includes a plurality of cells arranged in the same plane, and electrically coupled in parallel.

Each cell of a direct methanol fuel cell stack includes an anode, a cathode, and an electrolyte disposed therebetween. Each cell generates a voltage of about 0.4 to 0.6V. When an output of about 5V is required, a fuel cell stack may include at least 10 cells, which are electrically coupled in series.

An activation process is performed on a fuel cell stack, after the fuel cell stack is assembled. The activation process includes initially operating a fuel cell stack under a specific load, for a predetermined time, to check the maximum performance thereof, before the fuel cell stack is delivered. Generally, a high-concentration polar solvent is used to reduce the length of the activation process. For example, it takes about 1 hour to activate a laminated fuel cell stack, using a 10 molar methanol aqueous solution. On the other hand, it takes about 70 to 100 hours to activate a laminated fuel cell stack, using a 1 molar methanol aqueous solution.

After the activation process is performed, an initial performance test is generally performed. In the initial performance test, a desired performance may not be obtained from a specific cell in a fuel cell stack, due to certain defects. Such defects may occur when a membrane electrode assembly (MEA) is defective, or when a fuel flow channel in a separator is blocked, by an impurity introduced during manufacturing or introduced from a fuel. In most cases, the impurity can be easily removed from the fuel flow channel, by increasing a flux of the fuel, or by reversing a flow direction of the fuel.

Generally, after an impurity is removed from the channel of a defective cell, the defective cell still does not show a desired performance. This is because the initial activation process was not appropriately performed, due to the impurity.

When the activation process is repeated to activate the aforementioned defective cell, the non-defective cells are also reactivated. The non-defective cells can be degraded by the reactivation. Therefore, only the defective cells should be activated, without reactivating the non-defective cell. Conventionally, this is accomplished by disassembling the fuel cell stack, so as to activate only the defective cell. However, disassembling a laminated stack is complicated and increases processing time.

In addition, in activated cells, an electrolyte membrane is expanded. Therefore, it is difficult to properly disassemble and reassemble a laminated stack. Further, this process may lead to a decrease in the performance of the laminated stack.

SUMMARY OF THE INVENTION

An aspect of the present invention provides an activation method and system capable of selectively activating only a defective cell of a laminated fuel cell stack.

According to an aspect of the present invention, the present invention provides a system to activate a fuel cell stack, which includes: a tank to store a polar solvent that is used to activate cells of the fuel cell stack; a body having a transfer unit to transfer the polar solvent to the fuel cell stack, and a control unit to controlling the transfer unit; and a nozzle coupled to the body and inserted into an inlet manifold of the fuel cell stack, the nozzle having an opening positioned to jet the polar solvent into a channel of the non-activated cell.

According to an aspect of the present invention, the opening is provided adjacent to a blocked end of the nozzle.

According to an aspect of the present invention, the system may further include an auxiliary nozzle having a plurality of openings that are arranged according to channel inlets of the cells, and which is inserted into the inlet manifold. The nozzle may be inserted inside of the auxiliary nozzle, such that the nozzle is moveable along a length direction of the auxiliary nozzle.

According to an aspect of the present invention, the nozzle may include a groove and the auxiliary nozzle may include a channel corresponding to the groove. The groove can slide in the channel, such that the nozzle is aligned with the auxiliary nozzle.

According to an aspect of the present invention, the nozzle may have indicia corresponding to positions of the channel inlets of the cell.

According to an aspect of the present invention, the indicia may include a plurality of scale marks arranged at the same interval as the channel inlets.

According to an aspect of the present invention, the body may include a display unit to display the serial numbers of non-activated cell(s).

According to an aspect of the present invention, the nozzle may be made of stainless steel or a fluorine resin.

According to an aspect of the present invention, the polar solvent may include a 10 molar methanol aqueous solution.

According to an aspect of the present invention, the body may further include a measurement unit to measure an output voltage of each of the cells and a display unit to display information provided from the control unit. The control unit may compare the output voltage with a predetermined reference voltage and the output the serial number of a cell having an output voltage that is lower than the reference voltage.

According to another aspect of the present invention, provided is a method of activating a fuel cell stack, which includes: detecting a non-activated cell from amongst a plurality of activated cells in a fuel cell stack; selecting a nozzle having an opening positioned to jet a polar solvent into a channel inlet of the non-activated cell; inserting the nozzle into an inlet manifold of the fuel cell stack; and supplying the polar solvent to only the channel inlet of the non-activated cell, through the nozzle.

According to still another aspect of the present invention, the present invention provides a method of activating a fuel cell stack, which includes: detecting a non-activated cell from amongst a plurality of activated cells; inserting a nozzle into an inlet manifold of the fuel cell stack; positioning an opening of the nozzle opposite to a channel inlet of the non-activated cell; and supplying the polar solvent to only the channel inlet, through the nozzle, so as to activate the non-activated cell.

According to an aspect of the present invention, the positioning of the opening of the nozzle comprises using a scale mark disposed on the nozzle, to position the nozzle in the inlet manifold. A cell serial number may also be used, in conjunction with the scale mark, to position the nozzle.

According to aspects of the present invention, a defective cell can be selectively activated, after the defective cell is restored.

According to an aspect of the present invention, when a defective cell, which can be restored, is produced in the activation process, only the defective cell is selectively activated, without disassembling the laminated fuel cell stack, thereby maintaining the uniform performance of the fuel cell stack and enhancing a stack yield.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which:

FIG. 7 is a flowchart illustrating a process of activating a fuel cell stack, according to an exemplary embodiment of the present invention;

FIG. 8 is a cross-sectional view of a fuel cell stack an the activation system of the present invention;

DETAILED DESCRIPTION OF THE EXEMPLARY EMBODIMENTS

Figure 1:
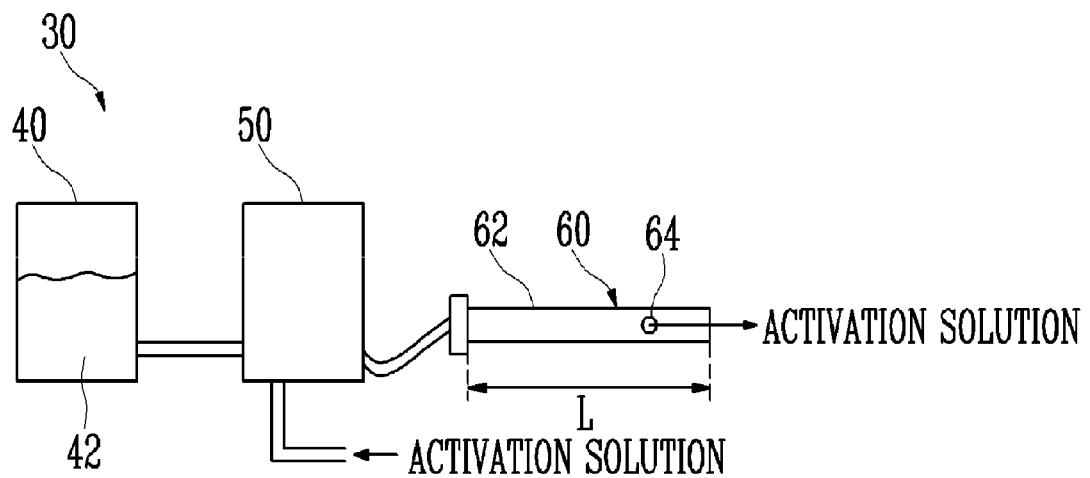
FIG. 1 is a block diagram of an activation system, according to a first exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
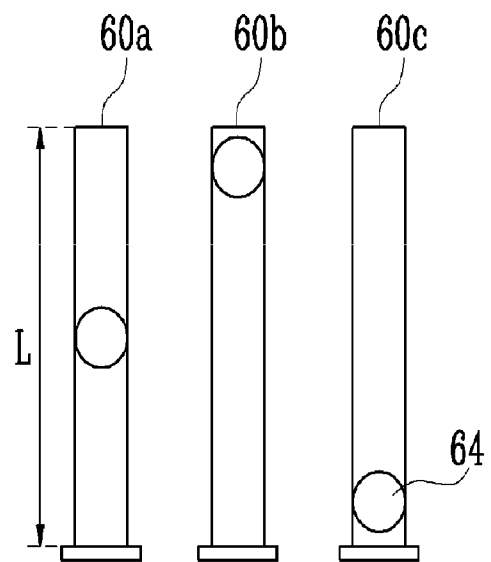
FIG. 2 is a front view showing nozzles of the activation system of FIG. 1.
Figure 3:
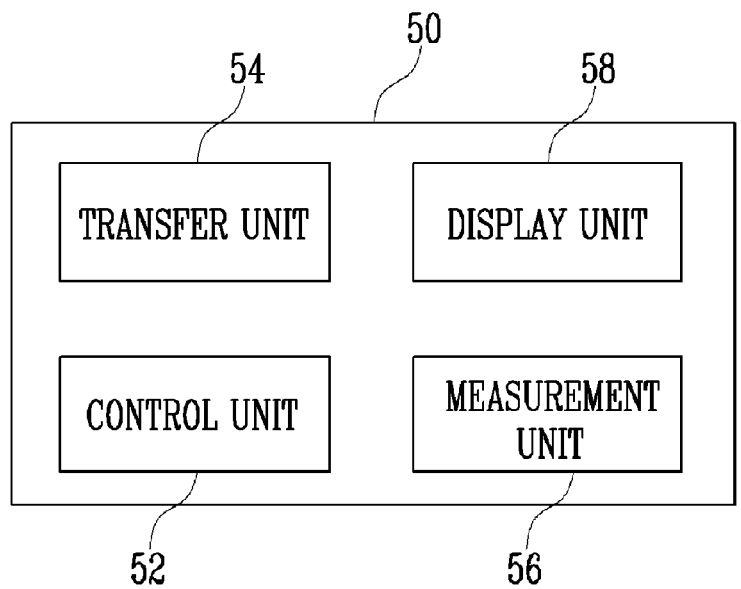
FIG. 3 is a block diagram showing a body of the activation system of FIG. 1.
Figure 4:
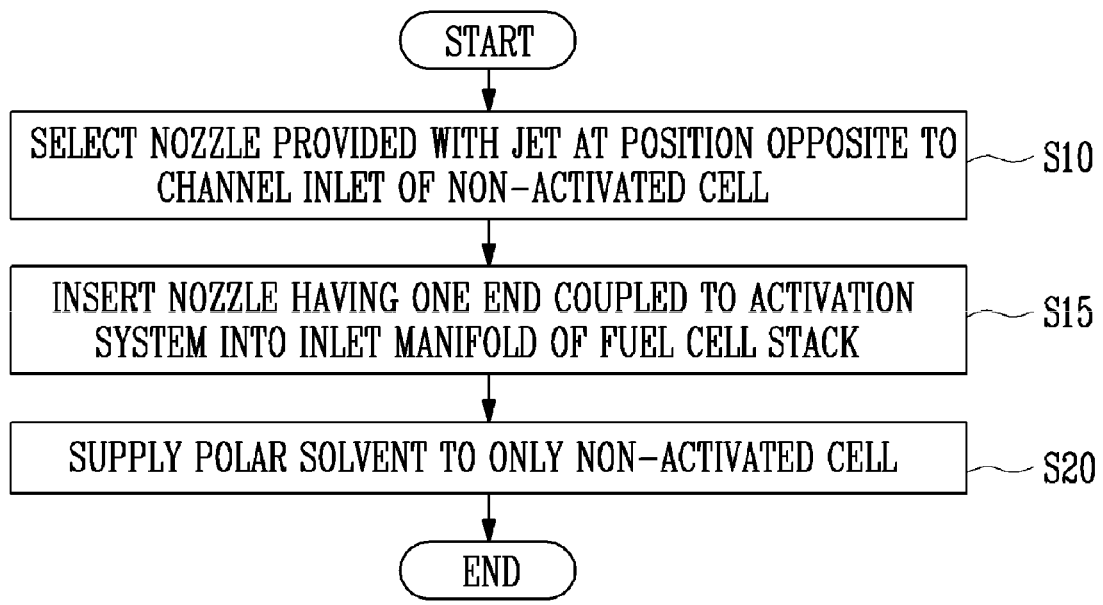
FIG. 4 is a flowchart illustrating an activation process, according to the first exemplary embodiment of the present invention.

FIG. 1 is a block diagram of an activation system, according to a first exemplary embodiment of the present invention. FIG. 2 is a front view showing nozzles of the activation system of FIG. 1. FIG. 3 is a block diagram showing a body of the activation system of FIG. 1. FIG. 4 is a flowchart illustrating an activation process, using the first exemplary embodiment of the present invention.

Referring to FIG. 1, provided is an activation system 30 to activate a laminated fuel cell stack, and then to selectively activate at least one defective cell of the fuel cell stack. The activation system 30 includes a tank 40, a body 50, and a nozzle 60. The tank 40 stores a polar solvent 42, and the body 50 performs an activation process on a fuel cell stack, using the polar solvent 42. The nozzle 60 has one end that is coupled to the body 50. The body 50 controls the transfer of the polar solvent 42 from the tank 40 to the nozzle 60.

The activation system 30 performs an initial activation process to activate all cells of a fuel cell stack, and a repair and/or reactivation process to activate one or more defective cells. The activation process involves controlling the granularity, shape, and strength of a material, such as a catalyst or electrolyte, so as to maximize the performance of the material when the fuel cell stack is operated.

The polar solvent 42 includes a high-concentration methanol aqueous solution, which has a higher concentration than methanol aqueous solutions generally used in a direct methanol fuel cell stack. For example, the polar solvent 42 includes an approximately 10 molar methanol aqueous solution.

The polar solvent 42 may include a co-solvent in addition to the methanol. The co-solvent includes at least one selected from the group consisting of acetonitrile, dimethylacetamide (DMAC), dimethylsulfoxide (DMSO), hydrochloric acid, and sulphuric acid.

The nozzle 60 includes a tube-shaped frame member 62 having a length L that corresponds to the length of an anode inlet manifold of a laminated fuel cell stack. The frame member 62 has an opening 64 formed therein, through which the polar solvent 42 is ejected. One end of the frame member 62 is coupled in fluid communication with the body 50. The other end of the frame member 62 is blocked. Therefore, the polar solvent 42 can flow from the tank 40, through the body 50, into the frame member 62, and then be expelled through the opening 64. The polar solvent 42 can flow in an opposite direction, so as to be recycled.

As shown in FIG. 2, the activation system 50 can include a plurality of different nozzles 60a-60c, which have openings 64 that are positioned in different locations, according to the positions of respective cells in a laminated fuel cell stack. A particular nozzle 60a-60c may be selectively attached to the body 50, according to the position of a defective cell. In other words, a nozzle 60a-60c, having an opening 66 that corresponds to the position of the defective cell, can be selectively attached to the body 50. In a fuel cell stack having a plurality of laminated cells, the position of a defective cell may be calculated as a distance from an opening of an anode inlet manifold, to an inlet channel of a defective cell. The inlet channel is coupled to the anode inlet manifold. In this way a fluid can be selectively injected into the appropriate inlet channel. When multiple defective cells are produced, different ones of the nozzles 60a-60c can be accordingly selected, so as to sequentially activate the defective cells.

As shown in FIG. 3, the body 50 includes a transfer unit 52, a control unit 54 to control the transfer unit 52, a measurement unit 56, and a display unit 58. The transfer unit 52 transfers the polar solvent 42 from the tank 40 to the nozzle 60. The measurement unit 56 measures a voltage of each cell, after the cells are activated. The control unit 54 compares the measured voltage of each of the cells with a reference voltage, to detect defective cells. The control unit 54 provides this information to the display unit 58. The display unit 58 then indicates which cell(s) are defective. The display unit 58 can make such an indication by displaying the serial number(s) of the defective cell(s).

Referring to FIGS. 1 to 4, one of the cells is not activated by the activation process, i.e., is a defective cell, an appropriate one of the nozzles 60a-60c is selected (S10). Here, the selected nozzle is referred to generically as the nozzle 60 and has an opening 42 than can be positioned at a channel inlet of the non-activated cell, when the nozzle 60 is inserted into an anode inlet manifold of the fuel cell stack.

Subsequently, one end of the nozzle 60 is coupled to the body 50, so that a fluid can flow between the nozzle 60, the body 50, and the tank 40. The nozzle 60 is then inserted into the anode inlet manifold of the fuel cell stack (S15). The polar solvent 42 is then selectively supplied to only the non-activated cell, using the nozzle 60 (S20).

According to the aforementioned process, only the non-activated cell can be selectively activated, without damaging other cells in the fuel cell stack, during the activation process. Accordingly, a fuel cell stack can be manufactured that has a uniform cell performance.

Figure 5A:
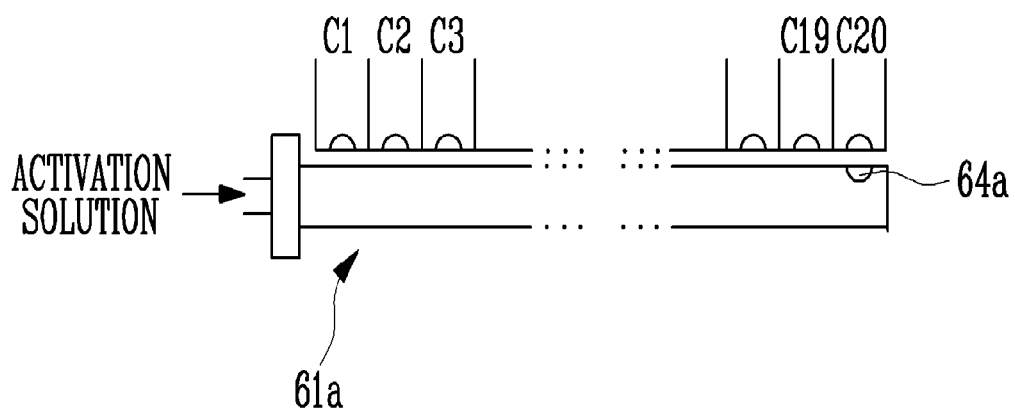
FIG. 5A illustrates a nozzle of an activation system, according to a second exemplary embodiment of the present invention.

FIG. 5A illustrates a nozzle 61a of an activation system, according to a second exemplary embodiment of the present invention. Referring to FIG. 5A, an opening 64a of the nozzle 61a is disposed to face a channel inlet of a cell C20, which is positioned furthest from the entrance of an anode inlet manifold of a fuel cell stack. In other words, the opening 64a is positioned adjacent to a blocked end of the nozzle 61a. The nozzle 61a may be made of stainless steel or a fluorine resin.

Figure 5B:
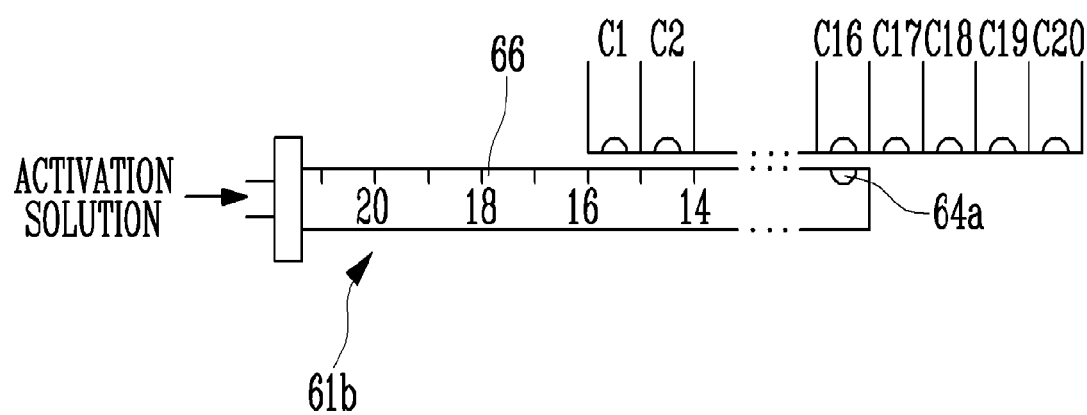
FIG. 5B illustrates a nozzle of an activation system, according to a third exemplary embodiment of the present invention.

In the second exemplary activation system, the position of the opening 64a is controlled by varying how far the nozzle 61a is inserted into the anode inlet manifold. Therefore, the second exemplary activation system does not need to include different nozzles to activate different cells FIG. 5B illustrates a nozzle 61b of an activation system, according to a third exemplary embodiment of the present invention. Referring to FIG. 5B, the nozzle 61b is similar to the nozzle 61a, except in that the nozzle 61b further includes indicia 66 on an outer surface thereof.

The indicia 66 relate to the distances at which the nozzle 61b should be inserted into an anode inlet manifold, such that particular cells can be selectively activated. By using the indicia 66, an activation process of a defective cell can be easily performed. The indicia may also comprise serial numbers, or other identifying marks, which correspond to particular cells.

Figure 6A:
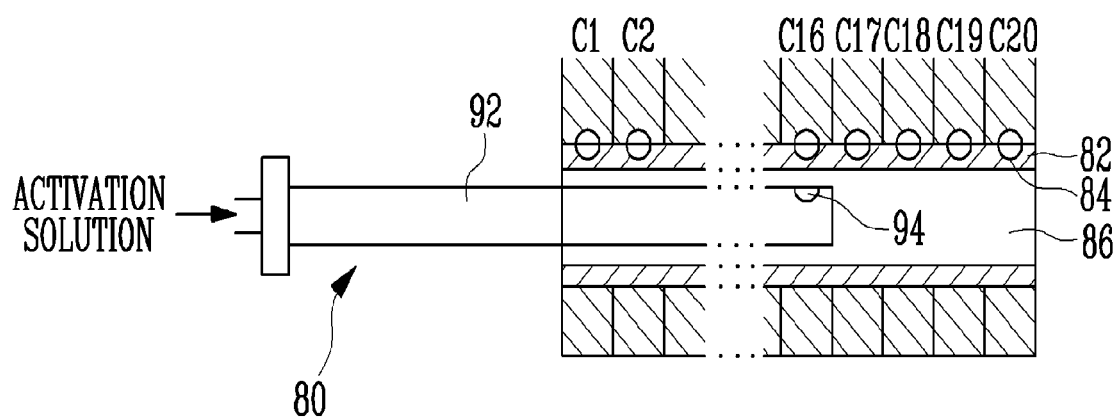
FIG. 6A illustrates a nozzle of an activation system, according to a fourth exemplary embodiment of the present invention.

FIG. 6A illustrates a nozzle 80 of an activation system, according to a fourth exemplary embodiment of the present invention. Referring to FIG. 6A, the nozzle 80 includes an auxiliary nozzle 82 and a main nozzle 92.

The main nozzle 92 is provided with an opening 94 and is inserted into a hollow portion 86 of the auxiliary nozzle 82, along a length direction thereof. The main nozzle 92 has the same material and structure as the nozzle 61a. Therefore, the main nozzle 92 will be simply referred to as a nozzle, in the following description.

The auxiliary nozzle 82 is inserted into an anode inlet manifold, of a fuel cell stack having first to twentieth laminated cells C1 to C20. The auxiliary nozzle 82 prevents an inner surface of the anode inlet manifold from being damaged, when the main nozzle 92 is moved within the anode inlet manifold. In order to prevent the surface of the anode inlet manifold from being damaged, the auxiliary nozzle 82 may be maintained in the fuel cell stack, after being inserted into the anode inlet manifold.

The auxiliary nozzle 82 may be made of stainless steel or a fluorine resin. However, the auxiliary nozzle 82 can have an insulation property, so as to prevent a short circuit between the cells, when it is inserted into the anode inlet manifold.

In the activation system of the third exemplary embodiment, the auxiliary nozzle 82 prevents damage to components of the fuel cell stack, such as a membrane electrode assembly, or a separator, which are exposed to the anode inlet manifold, during the activation of a defective cell. The auxiliary nozzle 82 prevents the formation of other defective cells, due to additional impurities being introduced during the activation process of the defective cell. The main nozzle 92 of this embodiment may include the above identified cell indicia.

Figure 6B:
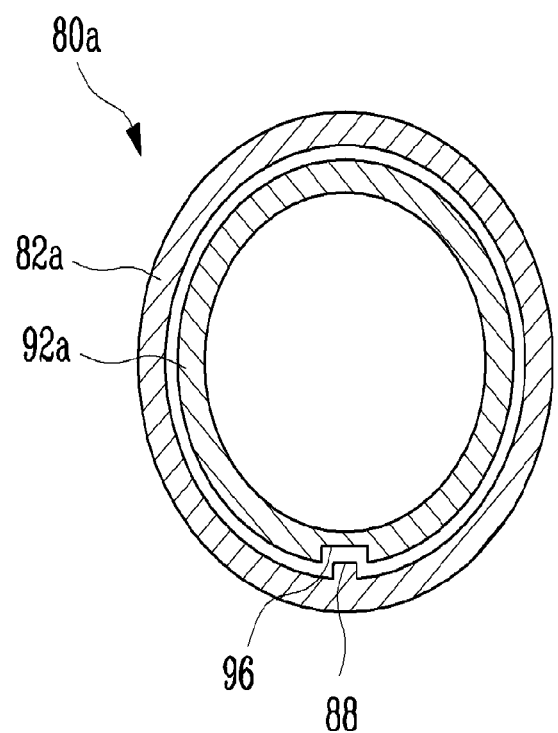
FIG. 6B illustrates a nozzle of an activation system, according to a fifth exemplary embodiment of the present invention.

FIG. 6B illustrates a nozzle 80a of an activation system, according to a fifth exemplary embodiment of the present invention. Referring to FIG. 6B, the nozzle 80a includes an auxiliary nozzle 82a and a main nozzle 92a.

The main nozzle 92a is similar to the main nozzle 92, except for the inclusion of a groove 96. The auxiliary nozzle 82a is similar to the auxiliary nozzle 82, except for the inclusion of a rib 88. The rib 88 is configured to slide in the groove 96 and thereby align the respective movements of the main nozzle 92a and the auxiliary nozzle 82a.

FIG. 7 is a flowchart illustrating a process of activating a fuel cell stack, according to an exemplary embodiment of the present invention. The process can be carried out using any of the previously described activation systems. Referring to FIG. 7, cell(s) that are not activated during the activation process are detected by a body of an activation system (S30). Subsequently, a nozzle that is coupled to the body is inserted into an anode inlet manifold of the fuel cell stack, in order to selectively activate only the non-activated cell(s), without disassembling the fuel cell stack (S35).

The position of the nozzle is controlled, so that an opening thereof is positioned opposite to a channel inlet of one of the non-activated cells (S40). The opening is shown positioned at a channel inlet of a cell that is furthest from the entrance of the anode inlet manifold.

In the operation S40, any of the nozzles of the second to fifth embodiments may be used. For example, the nozzle 60*a* of the second embodiment may be used when the inside of the anode inlet manifold is externally viewable. In other words, when a portion of the fuel cell stack is transparent, such that the nozzle 60*a* is visible in the anode inlet manifold, the nozzle 60*a* can be used. Subsequently, a polar solvent is supplied to only the particular non-activated cell, through the nozzle (S45).

According to the aforementioned process, specific cell(s), which are not activated during the activation process, can be selectively activated, without disassembling a fuel cell stack. Accordingly, the performance of the defective cell(s) is recovered, without damaging the other cells of the fuel cell stack.

FIG. 8 is a cross-sectional view of a fuel cell stack that is being serviced by an activation system of the present invention. Referring to FIG. 8, the fuel cell stack 100 includes an anode having an anode catalyst layer 103*a* and a first gas diffusion layer 105*a*; a cathode having a cathode catalyst layer 103*b* and a second gas diffusion layer 105*b*; and an electrolyte membrane 101 separating the anode and the cathode. A laminated assembly of the anode, the electrolyte membrane 101, and the cathode constitutes a cell, and can be referred to as a membrane electrode assembly (MEA). The fuel cell stack 100 also includes separators 107, gaskets 109, end plates 111, fastening members 113, an inlet manifold 121, and an outlet manifold 123.

The separators 107 can be separating plates positioned between the cells, so as to form a laminated assembly with the cells. The separator 107 includes a plurality of channels 108*a* that supply a mixed fuel to anodes of the respective cells, and/or a plurality of channels 108*b* that supply an oxidizer to cathodes of the respective cells. The gaskets 109 tightly seal the respective cells, to prevent the mixed fuel and oxidizer from leaking out, and to prevent ambient air and/or impurities from entering the respective cells.

The end plates 111 are disposed at both ends of the laminated assembly and are joined to each other by the fastening members 113, so as to support the laminated assembly. The manufactured fuel cell stack 100 is activated through an activation process. However, when some of the cells are not activated, the non-activated cells can be selectively activated, using the activation system. The activation process is described with respect to the nozzle 61*a* and the associated the activation system, however any of the nozzles and activation systems described herein, can be used.

The nozzle 61*a* inserted into the inlet manifold 121, and has the same cross-sectional shape as the inlet manifold 121. The shape of the nozzle 61*a* can be changed, so as to correspond to the shape of different the inlet manifolds.

According to this exemplary embodiment, specific cell(s) can be selectively activated, without disassembling the fuel cell stack 100, even after the activation process is finished. Accordingly, it is possible to prevent performance reductions associated with disassembling the fuel cell stack 100.

Figure 9A:
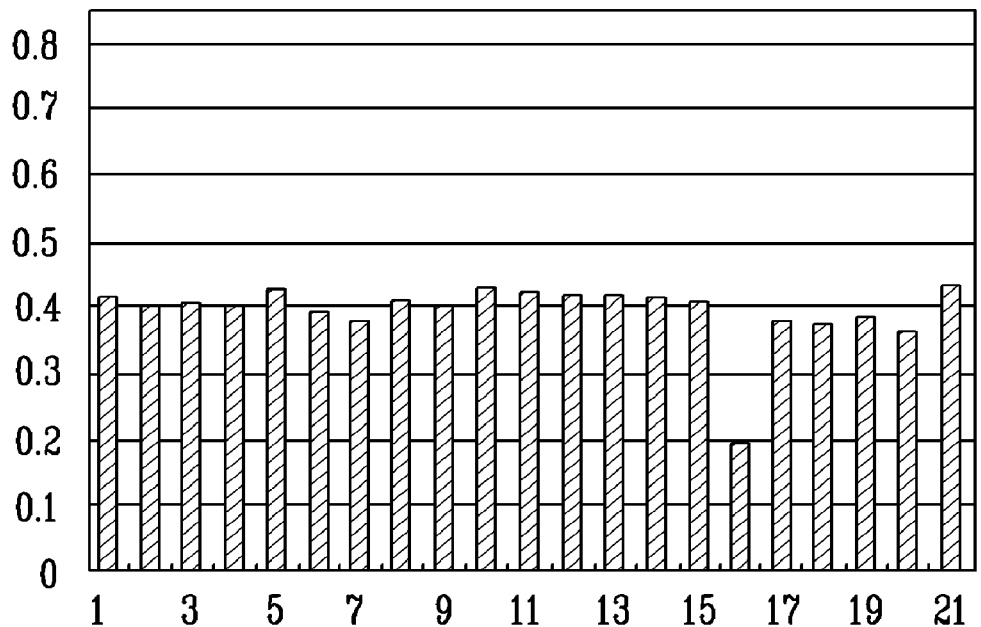
FIG. 9A is a graph illustrating the results of a stack performance test that is performed after activating a fuel cell stack.
Figure 9B:
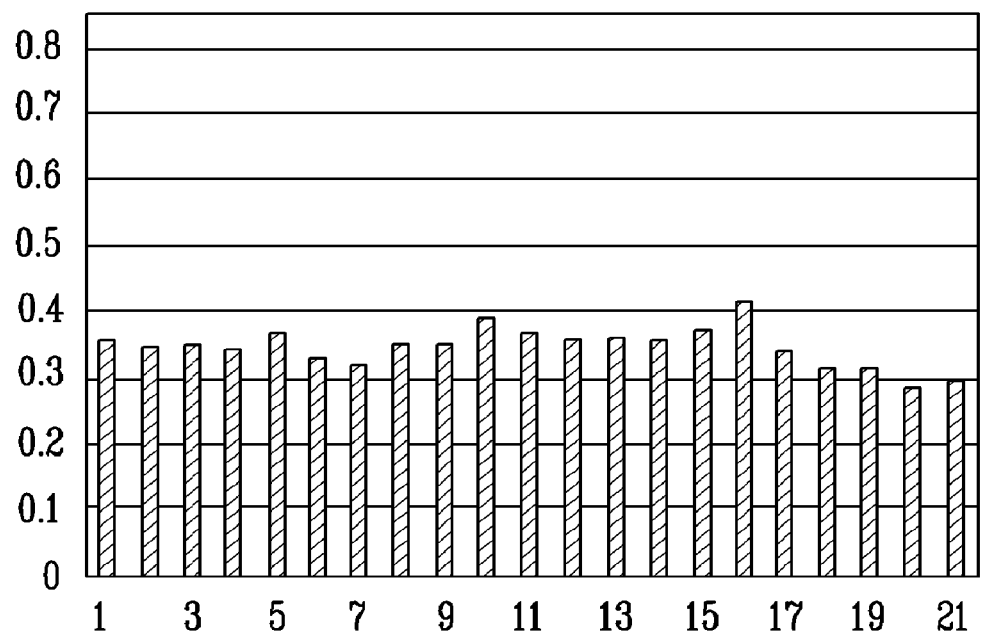
FIG. 9B is a graph showing the results of a stack performance test that is performed after a fuel cell stack is disassembled, and only the defective cell is then activated.
Figure 9C:
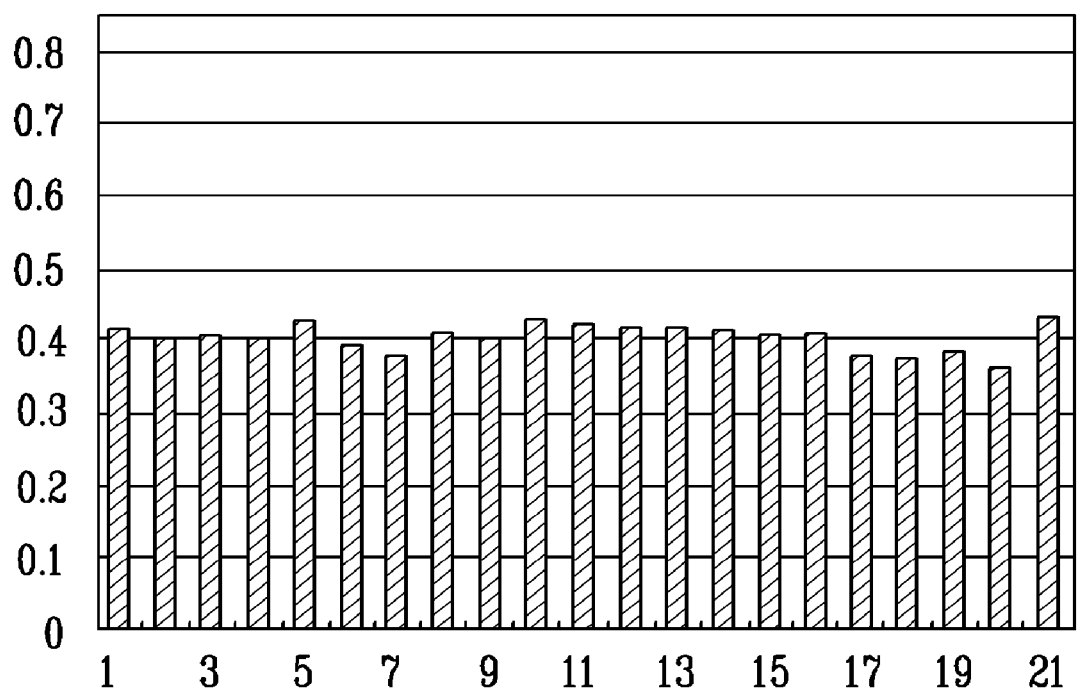
FIG. 9C is a graph showing the results of a stack performance test that is performed after a defective cell is selectively activated, without disassembling a fuel cell stack, using the activation system of the present invention.

FIG. 9A is a graph illustrating the results of a performance test, which was performed after activating a fuel cell stack. FIG. 9B is a graph showing the results of a performance test, that was performed after the fuel cell stack of FIG. 9A was disassembled and a defective cell was then activated. FIG. 9C is a graph showing the results of a performance test, that was performed after a defective cell was selectively activated, using the activation system of the present invention, without disassembling the fuel cell stack of FIG. 9A.

Referring to FIG. 9A, it can be seen that the sixteenth cell was a detective cell in a fuel cell stack having 21 cells. The detection of a detective cell was performed by measuring the output voltages of the cells, after the cells were activated, and then comparing the measured output voltages with a reference voltage. The voltages may alternatively be compared to one another, rather than to the reference voltage.

Referring to FIG. 9B, the fuel cell stack was disassembled, and the defective cell was repaired. Alternatively, the defective cell could have been replaced with a normal cell. Then all of the cells were reactivated, and the voltages thereof were tested. As shown in FIG. 9B the voltages of the majority of the cells was reduced, as compared to before the fuel cell stack was disassembled. This is because catalyst layers or electrolyte membranes of the previously activated cells were damaged during the disassembly/reassembly process.

FIG. 9C shows the results went only the defective cell was reactivated, without any disassembly. This process resulted in cells having improved voltages, as compared to when the fuel cell stack was disassembled.

The activation method and system is shown herein, are applied to a laminated stack-type direct methanol fuel cell. However, it will be understood by those skilled in the art that the activation methods and systems described herein can be applied to a laminated stack-type polymer electrolyte fuel cell.

Further, the activation method and system, employed after an initial activation process, has been described in the aforementioned exemplary embodiments. However, the activation system and methods, according to aspects of the present invention, can be applied to perform reactivation with respect to particular defective cells in the laminated fuel cell stack, which may be performed when a final user uses the fuel cell stack.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A system of activating a fuel cell stack, comprising: a tank to store a polar solvent comprising methanol to activate cells of the fuel cell stack; a body comprising, a transfer unit to transfer the polar solvent comprising methanol from the tank to the fuel cell stack, and a control unit to control the transfer unit; and a nozzle to direct the solvent through an inlet manifold of the fuel cell stack, comprising an opening to selectively direct the solvent comprising methanol into one of the cells, an open end connected to the body, and an opposing sealed end.

2. The system as claimed in claim 1, wherein the opening is disposed adjacent to the sealed end of the nozzle.

3. The system as claimed in any one of claims 2, wherein the nozzle comprises indicia to align the opening with each of the cells.

4. The system as claimed in claim 3, wherein the indicia comprises scale marks corresponding to channel inlets of the cells.

5. The system as claimed in claim 2, further comprising an auxiliary nozzle that corresponds to the inlet manifold, comprising openings corresponding to channel inlets of the cells, wherein the nozzle is configured to be selectively inserted into the auxiliary nozzle.

6. The system as claimed in claim 5, wherein:

the nozzle comprises a rib; and the auxiliary nozzle comprises a groove corresponding to the rib, wherein the rib slides along the groove, so as to guide the relative movements of the nozzle and auxiliary nozzle, when the nozzle is inserted into the auxiliary nozzle.

7. The system as claimed in any one of claims 6, wherein the nozzle comprises indicia to align the opening of the nozzle with each of the cells.

8. The system as claimed in claim 7, wherein the indicia comprises scale marks corresponding to the channel inlets of the cells.

9. The system as claimed in claim 1, wherein the nozzle is made of stainless steel, a fluorine resin, or a combination thereof.

10. The system as claimed in claim 1, wherein the polar solvent comprises a 10 molar methanol aqueous solution, or methanol and a co-solvent.

11. The system as claimed in claim 1, wherein:

the body further comprises a measurement unit to measure an output voltage of each of the cells; and a display unit to display information provided by the control unit; and the control unit compares the output voltage with a predetermined reference voltage and outputs a serial number of a cell having an output voltage that is lower than the reference voltage.

12. A method of activating a fuel cell stack, comprising: detecting a non-activated cell from among cells of the fuel cell stack that have been activated with a polar solvent comprising methanol; selecting a nozzle having an opening that corresponds to a channel inlet of the non-activated cell; inserting the nozzle into an inlet manifold of the fuel cell stack; and selectively supplying the polar solvent comprising methanol to the channel inlet of the non-activated cell, through the opening of the selected nozzle, so as to activate the non-activated cell.

13. A method of activating a fuel cell stack, comprising: detecting a non-activated cell from among cells of the fuel cell stack that have been activated with a polar solvent comprising methanol; inserting a nozzle having an opening into an inlet manifold of the fuel cell stack; controlling the position of the nozzle such that the opening faces a channel inlet of the non-activated cell; and selectively supplying the polar solvent comprising methanol to the channel inlet, through the opening of the nozzle, so as to activate the non-activated cell.

14. The method as claimed in claim 13, wherein the controlling of the position of the nozzle comprises using indicia disposed on the nozzle to align the opening with the non-activated cell.

15. The system as claimed in claim 1, wherein the body further comprises a display unit to display the cell serial number of the defective cell.

16. The system as claimed in claim 1, further comprising a plurality of nozzles that are connectable to the body, and which have openings disposed in different locations.

17. The system as claimed in claim 11, wherein the body further comprises a display unit to identify particular ones of the cells that are not activated.

18. The method as claimed in claim 12, further comprising removing the polar solvent from the fuel cell stack.

19. The method as claimed in claim 12, further comprising activating the cells prior to the detecting of the non-activated cell.

20. The method as claimed in claim 13, further comprising removing the polar solvent from the fuel cell stack.

21. The method as claimed in claim 13, further comprising activating the cells prior to the detecting of the non-activated cell.

* * * * *